United States Patent
Spinks et al.

(10) Patent No.: US 12,145,837 B2
(45) Date of Patent: Nov. 19, 2024

(54) APPARATUS AND METHOD FOR MAKING A RESILIENT UNIT

(71) Applicant: HS PRODCUTS LTD, Leeds (GB)

(72) Inventors: Simon Spinks, Leeds (GB); David Clare, Leeds (GB)

(73) Assignee: HS PRODUCTS LIMITED, Leeds (GB)

( * ) Notice: Subject to any disclaimer, the term of this patent is extended or adjusted under 35 U.S.C. 154(b) by 355 days.

(21) Appl. No.: 16/083,605

(22) PCT Filed: Mar. 9, 2017

(86) PCT No.: PCT/GB2017/050631
§ 371 (c)(1),
(2) Date: Sep. 10, 2018

(87) PCT Pub. No.: WO2017/153758
PCT Pub. Date: Sep. 14, 2017

(65) Prior Publication Data
US 2020/0307990 A1    Oct. 1, 2020

(30) Foreign Application Priority Data
Mar. 9, 2016   (GB) .................... 1604040

(51) Int. Cl.
*B68G 9/00*      (2006.01)
*A47C 27/06*    (2006.01)
(Continued)

(52) U.S. Cl.
CPC .............. *B68G 9/00* (2013.01); *A47C 27/062* (2013.01); *A47C 27/064* (2013.01); *B65B 9/04* (2013.01);
(Continued)

(58) Field of Classification Search
CPC ........ B68G 9/00; B68G 15/00; A47C 27/062; A47C 27/064; A47C 27/065; F16F 3/04
See application file for complete search history.

(56) References Cited

U.S. PATENT DOCUMENTS

| | | | | |
|---|---|---|---|---|
| 1,192,510 | A | * | 7/1916 | Fischman ................. F16F 1/04 5/655.8 |
| 2,194,569 | A | * | 3/1940 | Rumpf ................... A47C 27/15 5/716 |

(Continued)

FOREIGN PATENT DOCUMENTS

| | | |
|---|---|---|
| DE | 10 2010 061089 A1 | 6/2012 |
| EP | 2 524 896 A1 | 11/2012 |

(Continued)

OTHER PUBLICATIONS

WO 9934712_eng Translation (Year: 1999).*
(Continued)

*Primary Examiner* — Justin C Mikowski
*Assistant Examiner* — Amanda L Bailey
(74) *Attorney, Agent, or Firm* — Renner, Otto, Boisselle & Sklar, LLP

(57) ABSTRACT

Apparatus for forming a resilient unit comprises a conveyor (210) and first and second spring supply stations (212 and 214), arranged in use to deposit respectively first and second spring types (216 and 218) under compression onto the conveyor. The conveyor is arranged in use to convey a row of the springs (216, 218) in a direction shown by Arrows A4 towards pocketing station (220). At the pocketing station (220) the springs are urged from the conveyor into positions between upper and lower sheets (222 and 224), by a plurality of inserter devices (226) that move together in a reciprocating fashion in the direction of arrow A5, before retracting to the position shown. After each row of springs is inserted between the sheets (222), upper and lower computer-con-
(Continued)

trolled welding tools (not shown) come together at positions P between the springs to join the sheets together, forming pockets in which the springs are encased. After each welding event the resilient unit is indexed forwards a distance equal to one pocket width in the direction of Arrows A6 by computer-controlled drive means (not shown). The next row of springs is then conveyed into position ready for insertion between the sheets of material, and the process is repeated. The two spring supply stations are arranged to supply springs that differ from one another in at least one characteristic.

6 Claims, 5 Drawing Sheets

(51) Int. Cl.
 B65B 9/04 (2006.01)
 B65B 63/02 (2006.01)
 B68G 15/00 (2006.01)
 F16F 3/04 (2006.01)

(52) U.S. Cl.
 CPC ............ B65B 63/022 (2013.01); B68G 15/00 (2013.01); F16F 3/04 (2013.01)

(56) References Cited

U.S. PATENT DOCUMENTS

| | | | | |
|---|---|---|---|---|
| 2,724,842 | A * | 11/1955 | Rogovy | A47C 27/061 |
| | | | | 5/248 |
| 4,485,506 | A * | 12/1984 | Stumpf | A47C 27/064 |
| | | | | 5/655.8 |
| 6,408,514 | B1 * | 6/2002 | Mossbeck | B21F 33/04 |
| | | | | 140/3 CA |
| 6,523,812 | B1 * | 2/2003 | Spinks | A47C 27/001 |
| | | | | 267/166 |
| 7,850,153 | B2 * | 12/2010 | Bock | A47C 27/064 |
| | | | | 5/247 |
| 7,908,693 | B2 * | 3/2011 | DeMoss | A47C 27/064 |
| | | | | 5/256 |
| 8,905,386 | B2 * | 12/2014 | Rasbach | F16F 3/04 |
| | | | | 267/290 |
| 8,978,183 | B1 * | 3/2015 | Richmond | A47C 27/062 |
| | | | | 5/655.8 |
| 9,943,173 | B2 * | 4/2018 | Krtek | A47C 27/064 |
| 10,010,188 | B2 * | 7/2018 | Hsu | A47C 27/064 |
| 10,610,029 | B2 * | 4/2020 | DeMoss | A47C 27/065 |
| 10,905,246 | B2 * | 2/2021 | Thomas | A47C 27/064 |
| 11,033,114 | B2 * | 6/2021 | DeMoss | A47C 27/064 |
| 11,058,227 | B2 * | 7/2021 | Thomas | A47C 27/062 |
| 11,680,617 | B2 * | 6/2023 | Spinks | A47C 27/064 |
| | | | | 267/91 |
| 2002/0152554 | A1 * | 10/2002 | Spinks | A47C 27/064 |
| | | | | 5/655.8 |
| 2007/0017035 | A1 * | 1/2007 | Chen | A47C 23/0433 |
| | | | | 5/655.8 |
| 2007/0130883 | A1 * | 6/2007 | Takahashi | B21F 27/16 |
| | | | | 53/285 |
| 2010/0257675 | A1 * | 10/2010 | DeMoss | A47C 27/065 |
| | | | | 5/720 |
| 2011/0099812 | A1 | 5/2011 | Spinks et al. | |
| 2016/0029809 | A1 * | 2/2016 | Shive | A47C 27/05 |
| | | | | 5/718 |
| 2018/0027983 | A1 * | 2/2018 | DeMoss | A47C 27/065 |
| 2018/0153310 | A1 * | 6/2018 | Thomas | A47C 27/062 |
| 2018/0168360 | A1 * | 6/2018 | Thomas | A47C 27/062 |
| 2018/0368585 | A1 * | 12/2018 | DeMoss | A47C 27/065 |

FOREIGN PATENT DOCUMENTS

| | | | |
|---|---|---|---|
| FR | 2 780 625 A1 | 1/2000 | |
| GB | 2 437 825 A | 11/2007 | |
| JP | S53 67512 U | 6/1978 | |
| TW | M 421 754 U | 2/2012 | |
| WO | WO-9934712 A1 * | 7/1999 | ......... A47C 23/0433 |
| WO | 2005/085123 A1 | 9/2005 | |
| WO | 2007/031774 A1 | 3/2007 | |

OTHER PUBLICATIONS

WO 1999/034712A1 English Translation from IP.com (Year: 1999).*
WO-9934712-A1 Eng translation (Year: 2007).*
International Search Report and Written Opinion for corresponding Patent Application No. PCT/GB2017/050631 dated Aug. 24, 2017.
Non-Final Office Action for corresponding U.S. Appl. No. 18/056,779, issued Feb. 13, 2024.

* cited by examiner

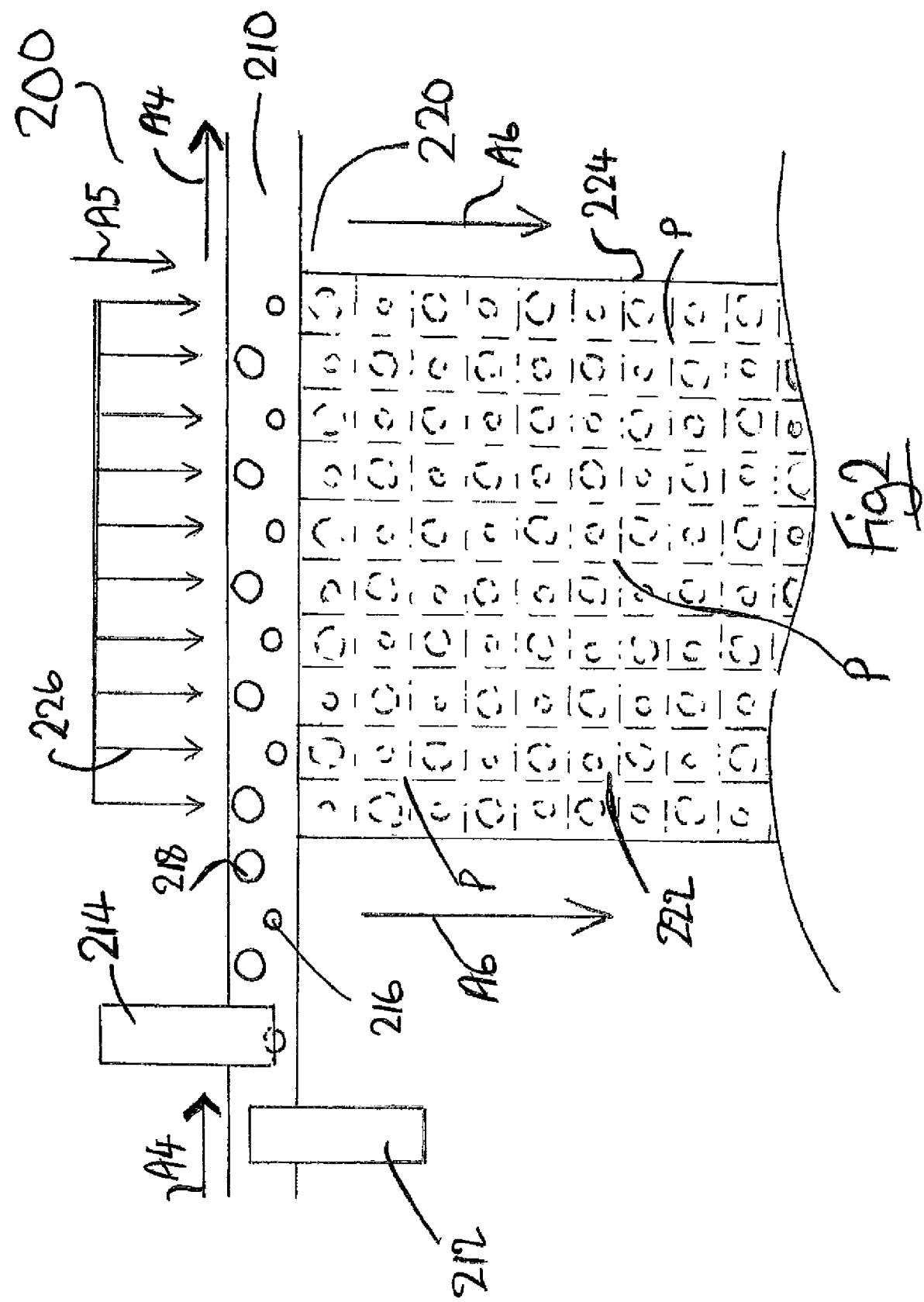

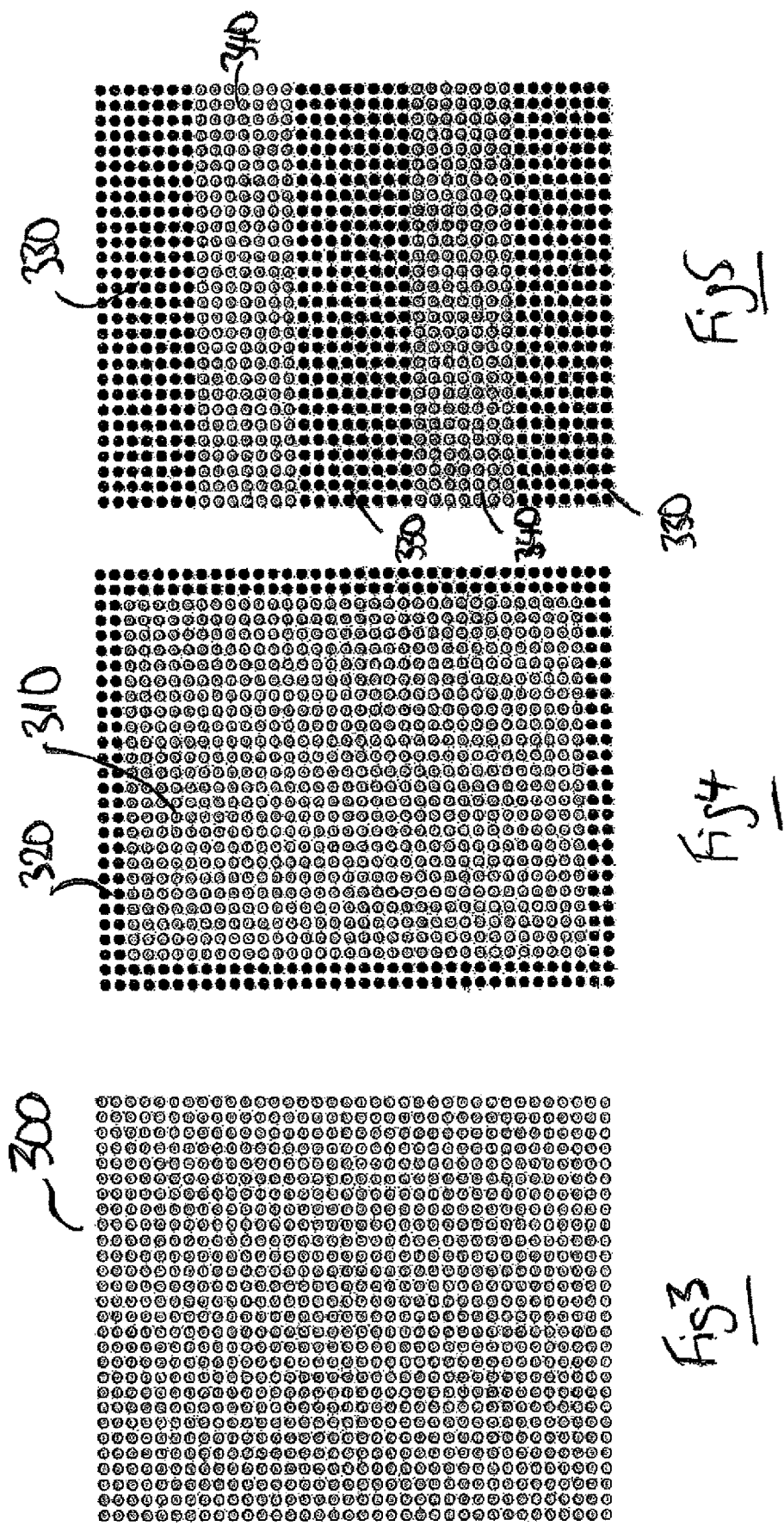

APPARATUS AND METHOD FOR MAKING A RESILIENT UNIT

The present invention relates to a resilient unit, and to an apparatus and a method for making a resilient unit, such as a mattress for example, and is concerned particularly, although not exclusively, with controlling the positioning of resilient elements during manufacture of such a unit.

A method and apparatus for making a resilient unit, such as a mattress, for example, are disclosed in our European patent number EP 1993 947 B. This describes the formation of a pocketed spring unit by feeding springs between upper and lower sheets of material, and joining the sheets together, for example by welding, at locations between the springs, to form pockets around the springs.

FIG. 1 shows schematically an example of apparatus described in the abovementioned patent. Springs 100 are conveyed under compression to a spring-inserting position by spaced belts 110*a* and 110*b*, where they are pushed by mechanical pushers 120 that are driven by a motor 130 to move in a reciprocating motion, indicated by arrow A1.

The pushers 120 push the springs into positions between sheets of material 130 fed from upper and lower supply rollers 140*a* and 140*b* via guide rollers 150*a* and 150*b*.

The sheets 130 are joined at positions between springs by the reciprocating action of an upper welding tool 160*a* in the direction shown by arrow A2 that presses the sheets together and fuses them on a welding anvil 160*b*. Rows of springs become encapsulated in pockets as the resilient unit 170 thus formed is advanced in the direction of Arrow A3.

The present invention is defined in the attached independent claims, to which reference should now be made. Further, preferred features may be found in the sub-claims appended thereto.

According to one aspect of the present invention, there is provided apparatus for making a resilient unit, the apparatus comprising at least first and second resilient element supply stations, and a pocketing station, wherein the first and second resilient element supply stations are arranged to supply respectively at least first and second resilient element types to the pocketing station, which first and second types differ from one another in at least one characteristic, and wherein the pocketing station is arranged in use to insert the resilient elements between superposed sheets of material, and to encapsulate the resilient elements in pockets formed by joining the sheets at least at positions between the springs.

Preferably the supply stations are arranged to supply the resilient elements to the pocketing station in at least one row. In a preferred arrangement, the apparatus is arranged to insert resilient elements between the sheets, one row at a time, and the sheets are joined together before the unit is advanced, and the next row is inserted. The apparatus is preferably arranged to supply the resilient elements to the pocketing station in a row in which the first and second types of resilient element are offset with respect to each other.

The resilient elements may be supplied to the pocketing station, preferably in a compressed state, on a conveyor, which may comprise one or more belts, or a belt and a compression plate, for example.

The resilient element types may differ from one another according to at least one characteristic, which may comprise any of a list including but not limited to: material composition, stiffness or resilience, height, width, colour, shape and handedness, i.e. direction of coil.

There may be three or more resilient element supply stations, arranged in use to supply respectively three or more resilient element types, which may differ from one another according to one or more characteristics.

The resilient elements may be supplied to the pocketing station in a row comprising a plurality of discrete resilient element locations. The individual element locations may be occupied by a resilient element of a first type, or a resilient element of a second, third or successive type, or may not be occupied by a resilient element at all.

The array of resilient units may therefore include resilient elements of one or more types, and may include locations in which there is no resilient element, so that one or more spaces may be located within the array.

The pockets may contain resilient elements of one or more various kinds or no resilient element.

One, more than one, or all, of the resilient elements may comprise a spring, which may be a coil spring and is preferably of metal. The first and second resilient element types may comprise first and second spring types, which may differ from one another in spring shape, characteristic, stiffness, gauge, diameter and/or other respects.

At least some of the resilient elements may comprise a first spring inside of which is a second spring. The second, inner spring is preferably not itself independently pocketed/encased.

The resilient unit may comprise an upholstered unit and/or may comprise an article from the following non-exhaustive list, including but not limited to: mattress, seat, table, pad, flooring, and may be used in various applications, in particular where resilience is needed for comfort, convenience, support or protection, for example.

In accordance with a second aspect of the present invention there is provided a method of making a resilient unit, the unit comprising an array of resilient elements in pockets formed between superposed sheets of material, the apparatus comprising: supplying at least first and second resilient element types from at least first and second supply stations to a pocketing station, which first and second types differ from one another in at least one characteristic, and inserting the resilient elements between superposed sheets of material at the pocketing station, to encapsulate the resilient elements in pockets formed by joining the sheets at least at positions between the springs.

The method preferably comprises supplying the resilient elements to the pocketing station in at least one row. Preferably the method comprises inserting the resilient elements in between the sheets, one row at a time, and joining together the sheets before the unit is advanced, and the next row is inserted. The resilient elements may be supplied to the pocketing station in a row in which the first and second types of resilient element are offset with respect to each other.

The method may include supplying the resilient elements to the pocketing station, preferably under compression, on a conveyor, which may comprise one or more belts, or a belt and a compression plate.

The method may comprise supplying the resilient elements to the pocketing station in a row comprising a plurality of discrete resilient element locations. The individual element locations may be occupied by a resilient element of a first type, or a resilient element of a second, third or successive type, or may not be occupied by a resilient element at all.

The array of resilient units made according to the method may, therefore, include resilient elements of one or more types, and may include locations in which there is no resilient element, so that one or more spaces may be located within the array.

The method may comprise arranging resilient elements in the resilient unit such that one or more zones are formed, in which the resilient elements have different characteristics. The method may include arranging resilient elements in the resilient unit such that a pattern is formed in the resilient unit, which pattern may provide a visual, aesthetic or structural effect.

In a further aspect, the invention provides a computer programme product on a computer readable medium, comprising instructions that, when executed by a computer, cause the computer to perform a method of making a resilient unit, the unit comprising an array of resilient elements in pockets formed between superposed sheets of material, the apparatus comprising: supplying at least first and second resilient element types from at least first and second supply stations to a pocketing station, which first and second types differ from one another in at least one characteristic, and inserting the resilient elements between superposed sheets of material at the pocketing station, to encapsulate the resilient elements in pockets formed by joining the sheets at least at positions between the springs.

The invention also comprises a program for causing a device to perform a method of making a resilient unit, the unit comprising an array of resilient elements in pockets formed between superposed sheets of material, the apparatus comprising: supplying at least first and second resilient element types from at least first and second supply stations to a pocketing station, which first and second types differ from one another in at least one characteristic, and inserting the resilient elements between superposed sheets of material at the pocketing station, to encapsulate the resilient elements in pockets formed by joining the sheets at least at positions between the springs.

The invention also includes a resilient unit made by apparatus or in accordance with a method as described herein.

According to another aspect of the present invention, there is provided a resilient unit, comprising an array of first springs located in discrete pockets formed between superposed sheets of material joined at least at positions between the springs, wherein inside at least some of the first springs are located second, inner, non-pocketed springs.

Preferably the springs are held under compression in the pockets.

In a preferred arrangement the second spring is taller/longer than the first spring. This may allow the second spring to be held by the fabric of the pocket, restricting its movement inside the first spring, and hence inhibiting contact between the first and second springs.

In a particularly preferred arrangement, the first spring may be wider than it is tall. The second spring may be taller than it is wide.

Preferably the first springs are of wire of a first gauge and the second springs are of wire of as second, different gauge.

Preferably the first gauge is greater, ie thicker, than the second gauge. In other words, the average diameter of the wire from which the first springs are made is greater than the average diameter of the wire from which the second springs are made.

The average diameter of the wire from which at least one of the first and second spring types is made may be below 1 mm.

In a preferred arrangement, the average diameter of the wire of the first springs is in a range 0.5 mm to 1.0 mm. The average diameter of the wire in the second spring type may be in a range 0.5 mm to 0.7 mm.

The invention may include any combination of the features or limitations referred to herein, except such a combination of features as are mutually exclusive, or mutually inconsistent.

A preferred embodiment of the present invention will now be described, by way of example only, with reference to the accompanying diagrammatic drawings, in which:

FIG. 2 shows schematically an arrangement of spring supply stations and a pocketing station, according to an embodiment of the present invention;

FIGS. 3 to 7 show schematically examples of variants in the resilient unit made using the apparatus of FIGS. 1 and 2.

Figure 1:
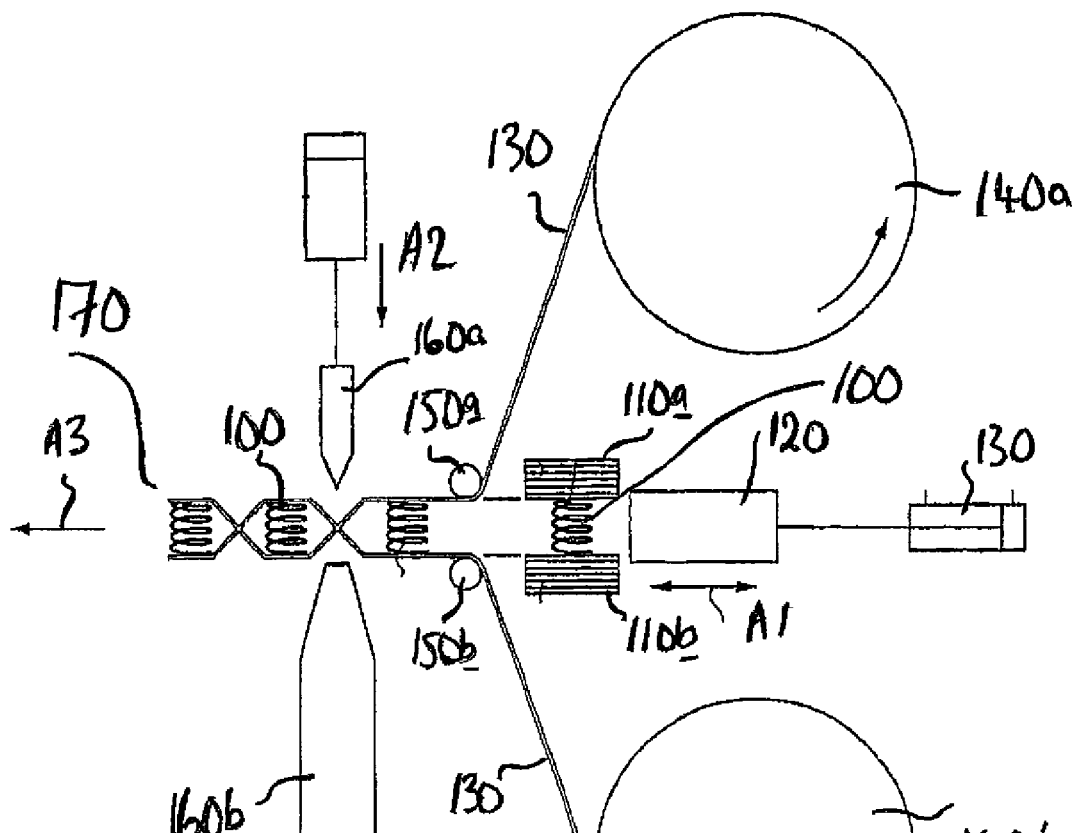
FIG. 1 shows in side schematic view a previously considered apparatus for forming a resilient unit.

Turning to FIG. 2, this shows schematically at 200 apparatus for forming a resilient unit. The apparatus comprises a conveyor 210 and first and second spring supply stations 212 and 214, arranged in use to deposit respectively first and second spring types 216 and 218 under compression onto the conveyor. The conveyor is arranged in use to convey a row of the springs 216, 218 in a direction shown by Arrows A4 towards pocketing station 220. The conveyor may be according to any suitable design that allows the springs to be transported securely, preferably under compression. For example a pair of superposed belts or a single belt opposite a stationary plate can be used.

At the pocketing station 220 the springs are urged from the conveyor into positions between upper and lower sheets 222 and 224, by a plurality of inserter devices 226 that move together in a reciprocating fashion in the direction of arrow A5, before retracting to the position shown.

After each row of springs is inserted between the sheets 222, upper and lower computer-controlled welding tools (not shown) come together at positions P between the springs to join the sheets together, forming pockets in which the springs are encased. After each welding event the resilient unit is indexed forwards a distance equal to one pocket width in the direction of Arrows A6 by computer-controlled drive means (not shown). The next row of springs is then conveyed into position ready for insertion between the sheets of material, and the process is repeated.

The two spring supply stations are arranged to supply springs that differ from one another in at least one characteristic. In this case the springs 216 are of smaller diameter and are taller and stiffer than the springs 218. The result is a resilient unit in which alternate springs are taller and stiffer than their immediate neighbours. Because of its appearance this type of unit is sometimes referred to as a "hi-lo" unit.

FIGS. 3 to 7 depict some examples of the different patterns of resilient unit that can be obtained by using the apparatus of FIG. 2. In particular, using the twin supply stations, it is possible to make up a row for insertion in which each one of a plurality of defined spring locations is occupied either by a spring of a first kind, a spring of a second kind or else no spring—i.e. the absence of a spring (when one of the supply stations suspends its deposition of a spring for one cycle.

The example of FIG. 3 is one in which the a resilient unit 300 is made up of only one kind of spring, so that one supply station provides a spring of a certain kind in each location for each row.

FIG. 4 shows an example in which the resilient unit comprises a main portion 310 of a first kind, with a border of a second kind 320 of spring. The border may be made to have springs of a stiffer characteristic, for example.

FIG. 5 is an example in which the resilient unit is made up of alternating zones 330, 340 of different springs, providing a different characteristic, such as stiffness.

Figure 6:
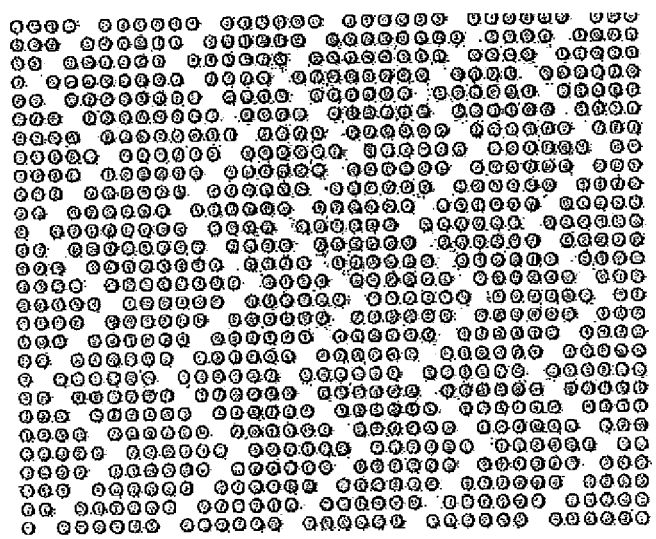

FIG. 6 uses a first kind of spring from one supply, combined with an absence of spring from the second supply, so that spaces appear to form a zig-zag visual pattern.

Figure 7:
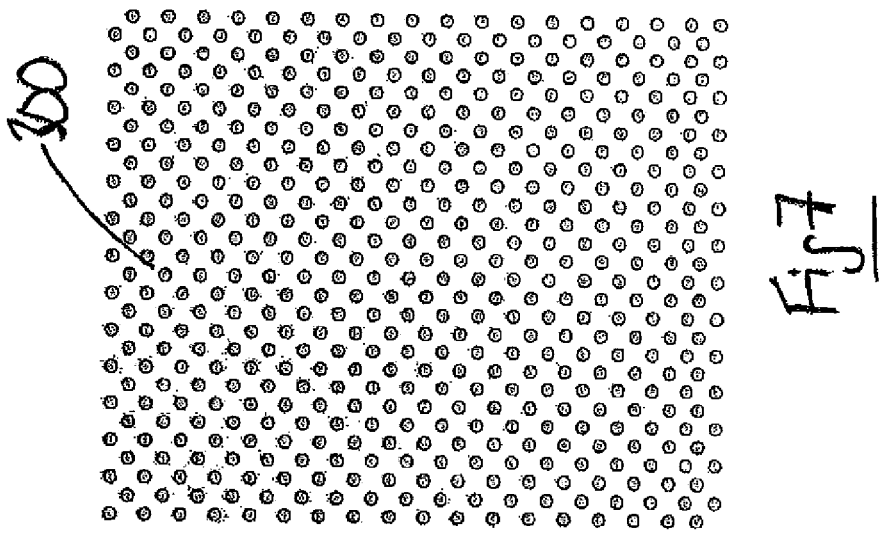

FIG. 7 shows a resilient unit 300 in which springs of one type are combined with absent springs, so as to reduce the density of springs in the unit 300.

It will be apparent to the reader that by using combinations of types of spring, or absences of spring, including springs that differ from one another in respect of one or more characteristics, it is possible to provide a resilient unit having a wide variety of patterns, both for aesthetic and functional purposes. Furthermore, the apparatus need not be confined to only two spring supply stations. With three or more supply stations the range of possibilities for more sophisticated patterns becomes still further extended.

The springs can differ from one another in respect of one or more characteristics such as from a list including but not limited to: stiffness, length, diameter, shape, colour and handedness—ie the direction of coil.

Furthermore, it is possible for a spring supply station to deposit more than one spring in the same location on the conveyor, for example by placing a pair of springs in a location, wherein one spring lies within the other, substantially coaxially.

Thus, in the assembled resilient unit, at least some of the pocketed springs may incorporate a second spring that is not encased in its own pocket—i.e. is not itself independently pocketed.

Figure 8B:
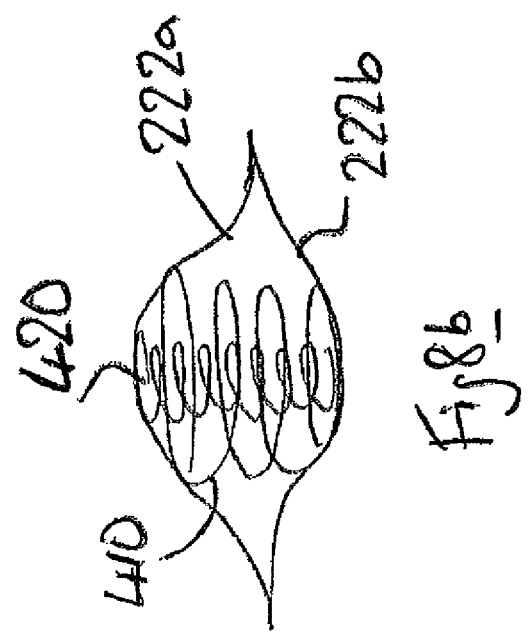
FIGS. 8*a* and 8*b* show examples of alternative combinations of spring according to an embodiment of the present invention.
Figure 8A:
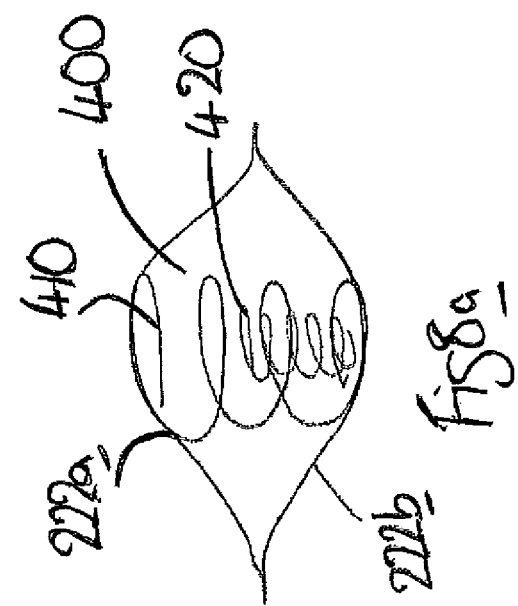

FIGS. 8*a* and 8*b* show examples of a pair 400 of springs encapsulated within a pocket formed by two superposed sheets 222*a* and 222*b* of material, as described above. In each case the pair comprises an outer spring 410 and an inner spring 420. In FIG. 8*a* the outer spring 410 is taller than the inner spring. In FIG. 8*b* the inner spring 420 is taller, so that it protrudes slightly above the outer spring. Different spring combinations can provide finely tuned resilient characteristics. Ideally, the inner spring is at least as tall as the outer spring, and is more preferably taller than the outer spring.

In one preferred embodiment, the inner spring may be taller than it is wide—i.e. its length is greater than its maximum diameter. The outer spring may be shorter than it is wide—i.e. its height/length is less than its maximum diameter.

If the inner spring is taller than the outer one, as shown in FIG. 8*b*, and is held under compression in the pocket, its ends will press against, and be held by, the material or fabric of the pocket. This preferred arrangement means that the inner spring will be less likely to move within the pocket, and therefore less likely to contact the outer spring, which would result in unwanted noise.

Another measure that can be employed to minimize unwanted noise of springs rubbing against springs is to make the inner and outer springs have different handedness—ie for their directions of coil to be in an opposite sense, one left handed and one right handed, when viewed from an end. This also lessens the likelihood of the substantially coaxial springs meshing or jamming together.

The inner spring being taller than the outer one also affects the compression characteristic of the resilient unit, since the resistance to compression of the unit will come only from the inner spring in a first phase of compression, before further compression encounters resistance from the outer spring also. Such a dual tension micro-spring provides a so-called "soft start" compression characteristic, which is often desirable, for example in a mattress.

The inner and outer springs can be of different basic types, or shapes. For example, possible shapes for the springs include, but are not limited to, cylindrical, conical, barrel-shaped, and also hybrid types such as are described in our UK patent application no. 2495499.

The choice of gauge for the wire used in the springs is important. One of the springs—preferably the inner spring—should be of a smaller gauge, i.e. it should be of wire having a smaller average diameter.

This helps to reduce the potential for the pair of springs to make unwanted noise as they contact one another during compression or relaxation. The wire in at least one of the springs, and preferably both the inner and outer spring, should be less than or equal to 1.0 mm in diameter. In a preferred arrangement the wire of the inner spring should be of a diameter in the range 0.5 mm to 0.7 mm and the outer spring should be of wire having a diameter in the range 0.5 mm to 1.0 mm.

At least some adjacent springs, or pairs of springs within springs, in the array are preferably arranged to be of different handedness—i.e. to be coiled in different directions—to combat any tendency for the resilient unit to become twisted due to the springs all being coiled in the same direction. Preferably the springs are arranged in alternate handedness.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A resilient unit, comprising:
a plurality of spring pairs, wherein:
  each spring pair includes an inner spring positioned inside of an outer spring;
  for each spring pair, the inner spring is taller than the outer spring;
an array of discrete pockets, wherein each pocket of the array of pockets includes a spring pair of the plurality of spring pairs that is entirely located within the pocket;
a first contiguous sheet of material and a second contiguous sheet of material directly joined together to form the array of discrete pockets, such that each pocket of the array of pockets is bounded by the first sheet and the second sheet
wherein, for each pocket of the array of pockets, when no external forces are applied to the pocket, the first sheet and the second sheet compresses the spring pair included in the pocket and hold the inner spring away from the outer spring so as to prevent contact between the inner spring and the outer spring.

2. The resilient unit according to claim 1, wherein the second spring is substantially held in position by the pocket of the first spring.

3. The resilient unit according to claim 1, wherein the first spring is wider than it is tall.

4. The resilient unit according to claim 1, wherein the second spring is taller than it is wide.

5. The resilient unit according to claim 1, wherein the first springs are of wire of a first gauge and the second springs are of wire of as second, different gauge.

6. The resilient unit according to claim 5, wherein the first gauge is greater than the second gauge.

* * * * *